US009009593B2

(12) United States Patent
White

(10) Patent No.: US 9,009,593 B2
(45) Date of Patent: Apr. 14, 2015

(54) APPARATUS AND METHOD FOR PROVIDING SET TOP BOX ASSISTANCE

(75) Inventor: Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1348 days.

(21) Appl. No.: 11/848,657

(22) Filed: Aug. 31, 2007

(65) Prior Publication Data

US 2009/0063969 A1    Mar. 5, 2009

(51) Int. Cl.
| | |
|---|---|
| H04N 5/445 | (2011.01) |
| H04N 7/173 | (2011.01) |
| G06F 13/00 | (2006.01) |
| G06F 17/30 | (2006.01) |
| H04N 21/231 | (2011.01) |
| H04N 21/232 | (2011.01) |
| H04N 21/24 | (2011.01) |
| H04N 21/431 | (2011.01) |
| H04N 21/432 | (2011.01) |
| H04N 21/472 | (2011.01) |
| G06F 9/44 | (2006.01) |
| G09B 7/00 | (2006.01) |
| G06Q 10/06 | (2012.01) |

(52) U.S. Cl.
CPC .......... *H04N 7/17318* (2013.01); *G06F 9/4446* (2013.01); *G09B 7/00* (2013.01); *G06Q 10/06* (2013.01); *H04N 21/231* (2013.01); *H04N 21/232* (2013.01); *H04N 21/2408* (2013.01); *H04N 21/4316* (2013.01); *H04N 21/432* (2013.01); *H04N 21/472* (2013.01)

(58) Field of Classification Search
CPC ......... G06Q 10/06; G06F 9/4446; G09B 7/00
USPC ............................................. 715/705; 725/80
See application file for complete search history.

(56) References Cited

U.S. PATENT DOCUMENTS

| | | | | |
|---|---|---|---|---|
| 5,956,716 | A  * | 9/1999 | Kenner et al. ................. | 709/217 |
| 6,371,765 | B1 * | 4/2002 | Wall et al. ..................... | 434/224 |
| 2002/0105409 | A1* | 8/2002 | Nakamitsu et al. ............ | 340/3.1 |
| 2002/0127531 | A1* | 9/2002 | Kamens et al. ............... | 434/350 |
| 2002/0174264 | A1* | 11/2002 | Fuller et al. .................... | 709/321 |
| 2002/0174444 | A1* | 11/2002 | Gatto et al. .................... | 725/133 |
| 2002/0175930 | A1* | 11/2002 | Kolde et al. ................... | 345/705 |
| 2003/0163361 | A1 | 8/2003 | Burgess | |
| 2003/0215779 | A1* | 11/2003 | Dupont et al. ................. | 434/350 |
| 2004/0048233 | A1* | 3/2004 | Matthews et al. ............. | 434/350 |
| 2004/0244056 | A1* | 12/2004 | Lorenz et al. .................. | 725/135 |
| 2005/0132408 | A1* | 6/2005 | Dahley et al. .................. | 725/80 |
| 2006/0086781 | A1 | 4/2006 | Jung | |
| 2006/0264259 | A1* | 11/2006 | Zalewski et al. ............... | 463/36 |
| 2007/0027733 | A1* | 2/2007 | Bolle et al. ..................... | 705/7 |
| 2007/0283389 | A1* | 12/2007 | Hallberg ......................... | 725/37 |
| 2008/0229362 | A1* | 9/2008 | White et al. .................... | 725/47 |

* cited by examiner

*Primary Examiner* — Jordany Nunez

(74) *Attorney, Agent, or Firm* — Guntin & Gust, PLC; Joseph Hrutka

(57) ABSTRACT

A system that incorporates teachings of the present disclosure may include, for example, a server having a controller to monitor for a tutorial request from a set top box coupled to a monitor display where the tutorial request is associated with use of the set top box, determine a tutorial type based on the tutorial request, and establish real time communication using a first webcam coupled to the set top box and a second webcam coupled to a communication device at a support center when the tutorial type is a video conference. Other embodiments are disclosed.

13 Claims, 6 Drawing Sheets

APPARATUS AND METHOD FOR PROVIDING SET TOP BOX ASSISTANCE

FIELD OF THE DISCLOSURE

The present disclosure relates generally to communication services and more specifically to an apparatus and method for providing set top box assistance.

BACKGROUND

Set top boxes (STBs) can provide presentation of media programming and content, recording of such programming and content, and additional features, such as Internet-downloadable content, music and photos playback services, and so on. Though often packed full of rich features, current and forthcoming STBs introduce new entertainment consumption paradigms and are often challenging for customers, even advanced customers, to use. Resources to help are low-fidelity (e.g., a large book) or disassociated from the user experience (e.g., a PC-based series of help articles or videos). The result is that users often use only the basic features of their STB and ignore other features that could be useful for the customer.

DETAILED DESCRIPTION

Figure 1:
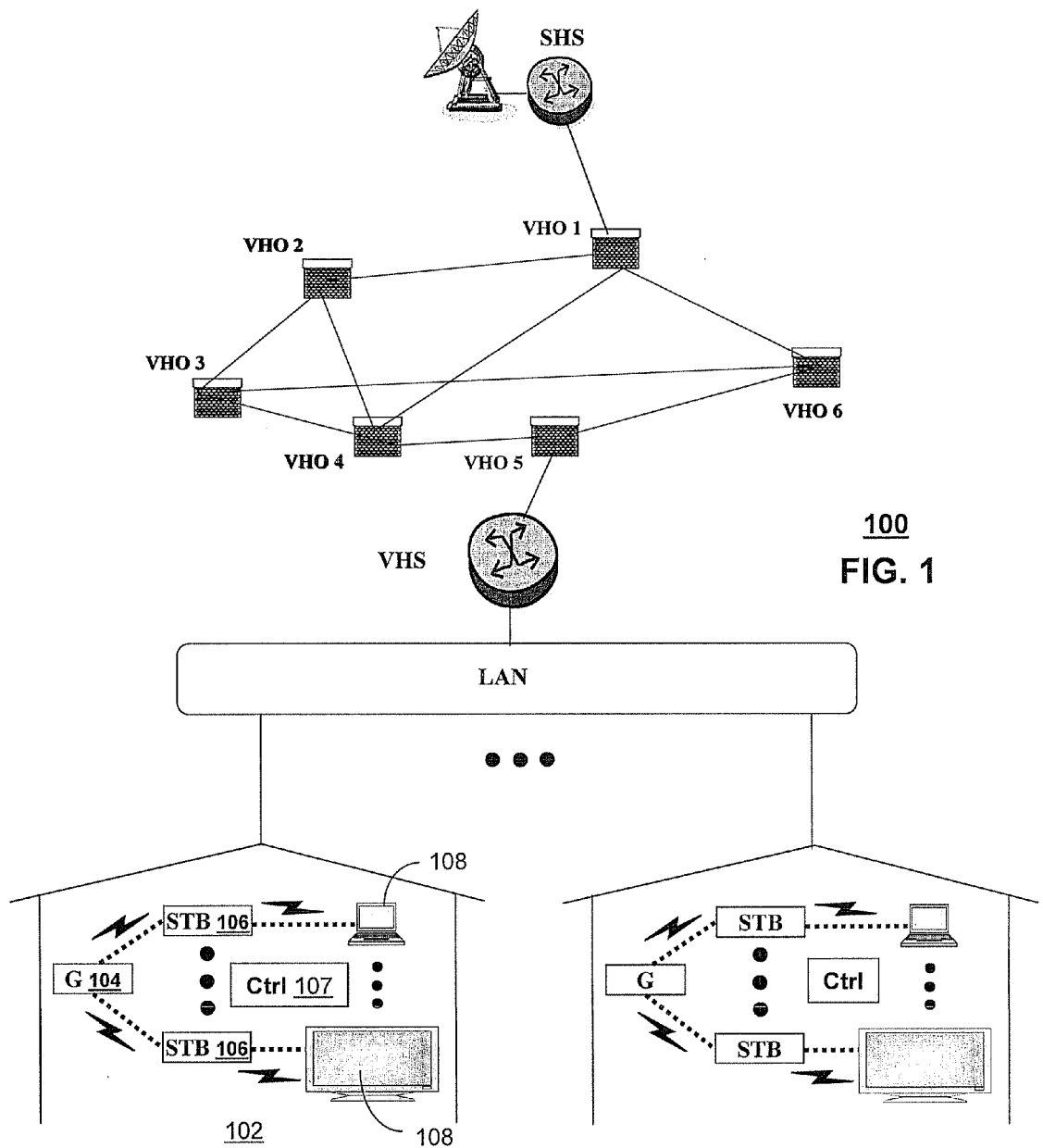
FIGS. 1-3 depict exemplary embodiments of communication systems.

In one embodiment of the present disclosure, a computer-readable storage medium can have computer instructions for presenting an operational interface for a set top box on a display monitor where the operational interface has a plurality of graphic controls for use of the set top box by a user, monitoring for a user input associated with one of the plurality of graphic controls, determining a tutorial video corresponding to the user input where the tutorial video comprising information associated with the use of the set top box and the one of the plurality of graphic controls, determining a location of the tutorial video from a library of tutorial videos where the library has local storage on the set top box and remote storage and where the location is at least one of the local storage and the remote storage, and obtaining the tutorial video from a remote source when the location is the remote storage.

In one embodiment of the present disclosure, a server can have a controller to monitor for a tutorial request from a set top box coupled to a monitor display where the tutorial request is associated with use of the set top box, determine a tutorial video corresponding to the tutorial request when the tutorial request is not for a video conference and where the tutorial video has information associated with the use of the set top box, and transmit the tutorial video to the set top box where the tutorial request is based at least in part on interactive user inputs to the set top box and a graphic object presented on the monitor display and being manipulated by the interactive user inputs.

In one embodiment of the present disclosure, a server can have a controller to monitor for a tutorial request from a set top box coupled to a monitor display where the tutorial request is associated with use of the set top box, determine a tutorial type based on the tutorial request, and establish real time communication using a first webcam coupled to the set top box and a second webcam coupled to a communication device at a support center when the tutorial type is a video conference.

In one embodiment of the present disclosure, a set top box can have a controller to monitor for a tutorial request from a set top box of a group of set top boxes, the set top box being coupled to a monitor display where the tutorial request is associated with use of the set top box, determine a tutorial video corresponding to the tutorial request when the tutorial request is not for a video conference and where the tutorial video has information associated with the use of the set top box, and transmit the tutorial video to the set top box where the tutorial request is based at least in part on interactive user inputs to the set top box and a graphic object presented on the monitor display and being manipulated by the interactive user inputs.

In one embodiment of the present disclosure, a method can involve presenting an operational interface for a set top box on a display monitor where the operational interface has a plurality of graphic controls for use of the set top box by a user, monitoring for a user input to the set top box, determining a tutorial request based on the user input, establishing real time communication using a first webcam coupled to the set top box and a second webcam coupled to a communication device at a support center when the tutorial request is for a video conference, and determining a tutorial video corresponding to the user input when the tutorial request is not for the video conference and where the tutorial video has information associated with the use of the set top box and one of the plurality of graphic controls.

FIG. 1 depicts an exemplary embodiment of a communication system 100 employing an IPTV broadcast media architecture. In a typical IPTV infrastructure, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 102 housing a gateway 104 (e.g., a residential gateway or RG). The gateway 104 distributes broadcast signals to media receivers 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media receivers 106 and subsystems of the IPTV media system 100 for services such as video-on-demand (VoD).

Figure 2:
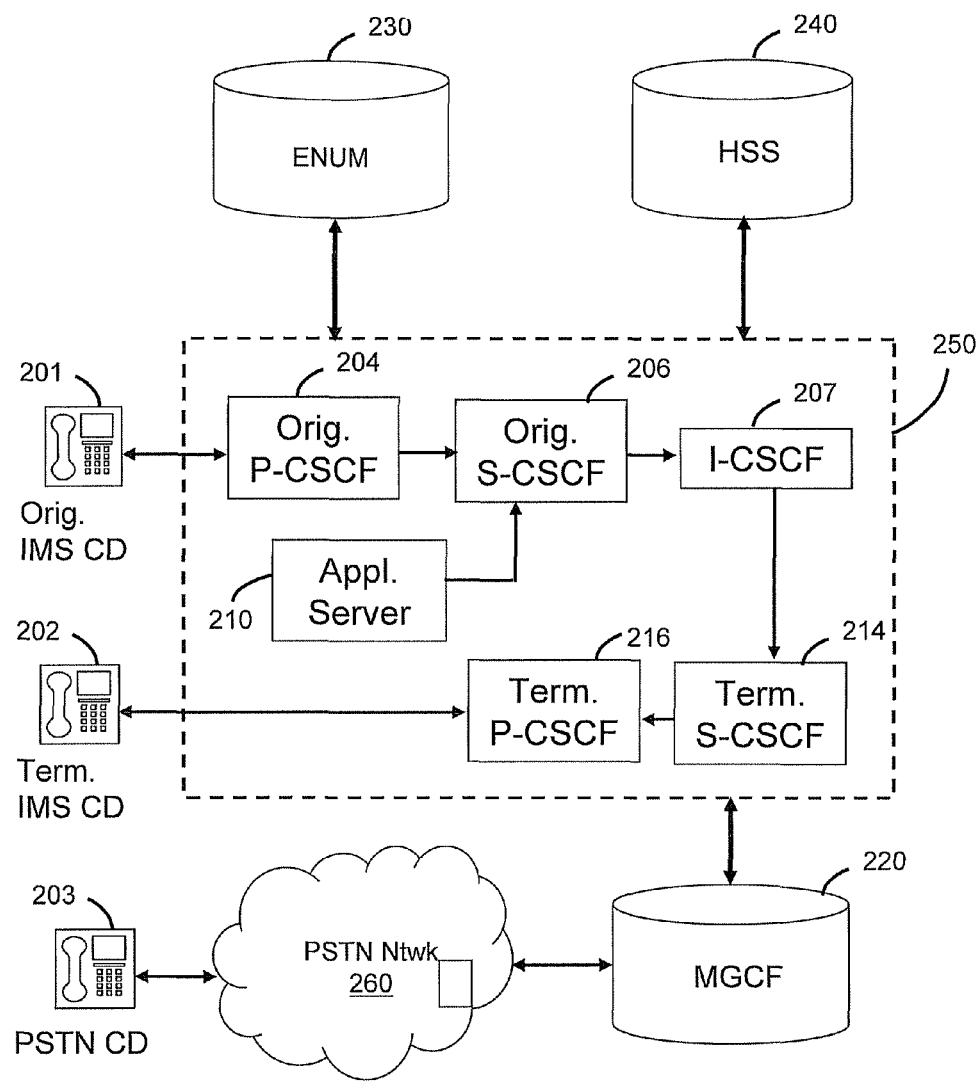

FIG. 2 depicts an exemplary embodiment of a communication system 200 employing a IP Multimedia Subsystem (IMS) network architecture. Communication system 200 can be overlaid or operably coupled with communication system 100 as another representative embodiment of communication system 100.

The communication 200 can comprise a Home Subscriber Server (HSS) 240, a tElephone NUmber Mapping (ENUM)

server 230, and network elements of an IMS network 250. The IMS network 250 can be coupled to IMS compliant communication devices (CD) 201, 202 (e.g., set top boxes) or a Public Switched Telephone Network (PSTN) CD 203 using a Media Gateway Control Function (MGCF) 220 that connects the call through a common PSTN network 260. CDs 201-203 can be fixed, mobile, wireless and/or wired devices.

IMS CDs 201, 202 can register with the IMS network 250 by contacting a Proxy Call Session Control Function (P-CSCF) which communicates with a corresponding Serving CSCF (S-CSCF) to register the CDs with an Authentication, Authorization and Accounting (AAA) support by the HSS 240. To accomplish a communication session between CDs, an originating IMS CD 201 can submit a SIP INVITE message to an originating P-CSCF 204 which communicates with a corresponding originating S-CSCF 206. The originating S-CSCF 206 can submit the SIP INVITE message to an application server (AS) such as reference 210 that can provide a variety of services to IMS subscribers. For example, the application server 210 can be used to perform originating treatment functions on the calling party number received by the originating S-CSCF 206 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 206 can submit queries to the ENUM system 230 to translate an E.164 telephone number to a SIP Uniform Resource Identifier (URI) if the targeted communication device is IMS compliant. If the targeted communication device is a PSTN device, the ENUM system 230 will respond with an unsuccessful address resolution and the S-CSCF 206 will forward the call to the MGCF 220 via a Breakout Gateway Control Function (not shown).

When the ENUM server 230 returns a SIP URI, the SIP URI is used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214 which can call on an application server similar to reference 210 to perform the originating treatment telephony functions described earlier. The terminating S-CSCF 214 can then identify a terminating P-CSCF 216 associated with the terminating CD 202. The P-CSCF 216 then signals the CD 202 to establish communications. The aforementioned process is symmetrical. Accordingly, the terms "originating" and "terminating" in FIG. 2 can be interchanged.

Figure 3:
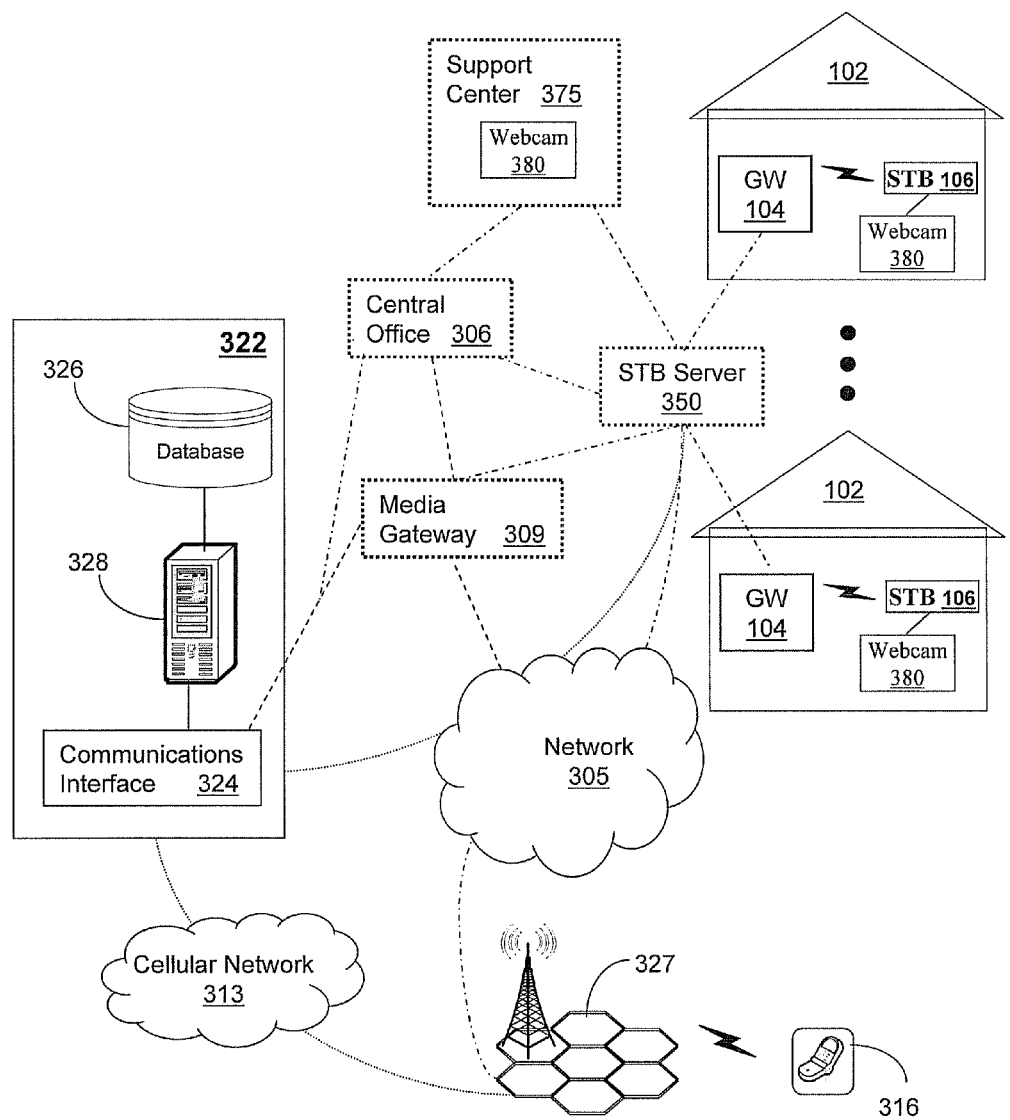

FIG. 3 depicts an exemplary embodiment of a communication system 300 employing set top box 106 communicating by way of wireless access points (WAPs) and/or wired infrastructure with other communication devices and/or a network proxy or web server 322, which collectively operate in the communication system 300. Communication system 300 can be overlaid or operably coupled with communication systems 100 and/or 200 as another representative embodiment of the communication system.

The set top boxes 106 can be multimedia devices for communicating video, voice and/or data, as well as receiving multimedia programming. The set top boxes 106 can include a tuner for receipt of the media programming, and can include a digital video recorder (DVR) or personal video recorder (PVR). The set top boxes 106 can be multimode communication devices that can communicate via a number of modes of communication, including wired and/or wireless communication. The Set top box 106 can include various components, such as a controller, communications interface and memory. The communication system 300 can comprise a packet-switched network 305. The packet-switched network can be an Internet Service Provider (ISP) network 305. The network 305 can be coupled to the network proxy 322, the cellular network 313 and network elements located in one or more of the buildings 102 representing an enterprise or residence. The ISP network 305 utilizes technology for transporting Internet traffic.

In an enterprise setting, the building 102 can include a gateway 104 that provides voice and/or video connectivity services between the set top boxes 106. In a residential setting, the building 102 can include a gateway 104 represented by, for example, a residential gateway coupled to central office 306 utilizing conventional telephonic switching for processing calls with third parties.

The network proxy 322 can be used to control operations of a media gateway 309, the central office 306 and the gateway 104. Communications between the network proxy 322, the set top boxes 106 and other network elements of the communication system 300 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 322 can comprise a communications interface 324 that utilizes common technology for communicating over an IP interface with the network 305, the media gateway 309, the cellular network 313, and/or the gateway 104. By way of the communications interface 324, the network proxy 322 can direct by common means any of the foregoing network elements to establish packet switched data, voice, and/or video connections with set top boxes 106 distributed throughout the communication system 300 and other communication devices. The network proxy 322 can further comprise a memory 326 (such as a high capacity storage medium) embodied in this illustration as a database, and a controller 328 that makes use of computing technology such as a desktop computer, or scalable server for controlling operations of the network proxy 322. The network proxy 322 can operate as an IP Multimedia Subsystem (IMS) conforming in part to protocols defined by standards bodies such as 3GPP (Third Generation Partnership Protocol).

Under the control of the network proxy 322, the media gateway 309 can link packet-switched and circuit-switched technologies such as the cellular network 313 (or central office 306) and the network 305, such as an ISP network. The media gateway 309 can conform to a media gateway control protocol (MGCP) also known as H.248 defined by work groups in the Internet Engineering Task Force (IETF). This protocol can handle signaling and session management needed during a multimedia conference. The protocol defines a means of communication that converts data from the format required for a circuit-switched network to that required for a packet-switched network. MGCP can therefore be used to set up, maintain, and terminate calls between multiple disparate network elements of the communication system 300. The media gateway 309 can therefore support hybrid communication environments for the set top boxes 106, including VoIP terminals.

The central office 306 can house common network switching equipment for distributing local and long-distance telecommunication services supplied by network 305 to buildings 102 (such as dwellings or commercial enterprises). Telecommunication services of the central office 306 can include traditional POTS (Plain Old Telephone Service) and broadband services such as HDTV, DSL, VoIP (Voice over Internet Protocol), IPTV (Internet Protocol Television), Internet services, and so on. The communication system 300 can utilize common computing and communications technologies to support circuit-switched and/or packet-switched communications.

The cellular network 313 can support voice and data services over a number of access technologies such as GSM-GPRS, EDGE, CDMA-IX, UMTS, WiMAX, software defined radio (SDR), and other known and future technologies. The cellular network 313 can be coupled to base stations 327 under a frequency-reuse plan for communicating over-the-air with other communication devices of the communication system, including set top boxes 106.

The communication system 300 can include an STB server 350 that is in communication with one or more of the STBs 106 in the system. The STB server 350 can include various components, such as a controller, communications interface and memory, and can utilize various protocols for communication with the STBs 106, as well as with other communication or network devices of the communication system 300. The STB server 350 can be a separate device or sub-system of the communication system 300, or can be incorporated with other components of the communication system, such as being incorporated into the network proxy 322, including sharing one or more components with the network proxy.

The communication system 300 can include a support center 375 that is in communication with one or more of the STBs 106 in the system. The support center 375 can include support personnel for providing assistance with respect to operation, maintenance and other aspects of the STB, and can include various hardware and software for providing the support, such as a server with a controller, communications interface and memory. The support center 375 can utilize various protocols for communication with the STBs 106, as well as with other communication or network devices of the communication system 300. In one embodiment, the support center 375 can provide automated information, including voice interactive support, which is provided to the user of the STB 106 through the STB and/or through another communication device. The STB server 350 can be a separate device or sub-system of the communication system 300, or can be incorporated with other components of the communication system, such as being incorporated into the network proxy 322, including sharing one or more components with the network proxy.

The STB 106 can have a webcam 380 or other communication interface that provides for audio and/or video communication between the user of the STB and a webcam or other communication interface of support personnel at the support center 375 (e.g., a video conference). The webcam 380 can have various components and can utilize various communication protocols for establishing communication between the user of the STB 106 and the support personnel of the support center 375. In one embodiment, the webcam 380 at the support center 375 can transmit video and audio signals that are displayed by the STB 106 on the TV or other display monitor, while the webcam 380 coupled to the STB can transmit video and audio signals that are displayed at the support center on a display monitor by a personal computer. The webcam 380 can be integrated into the STB 106 or can be a removable device, such as a webcam connectable with the STB through a USB port.

Figure 4:
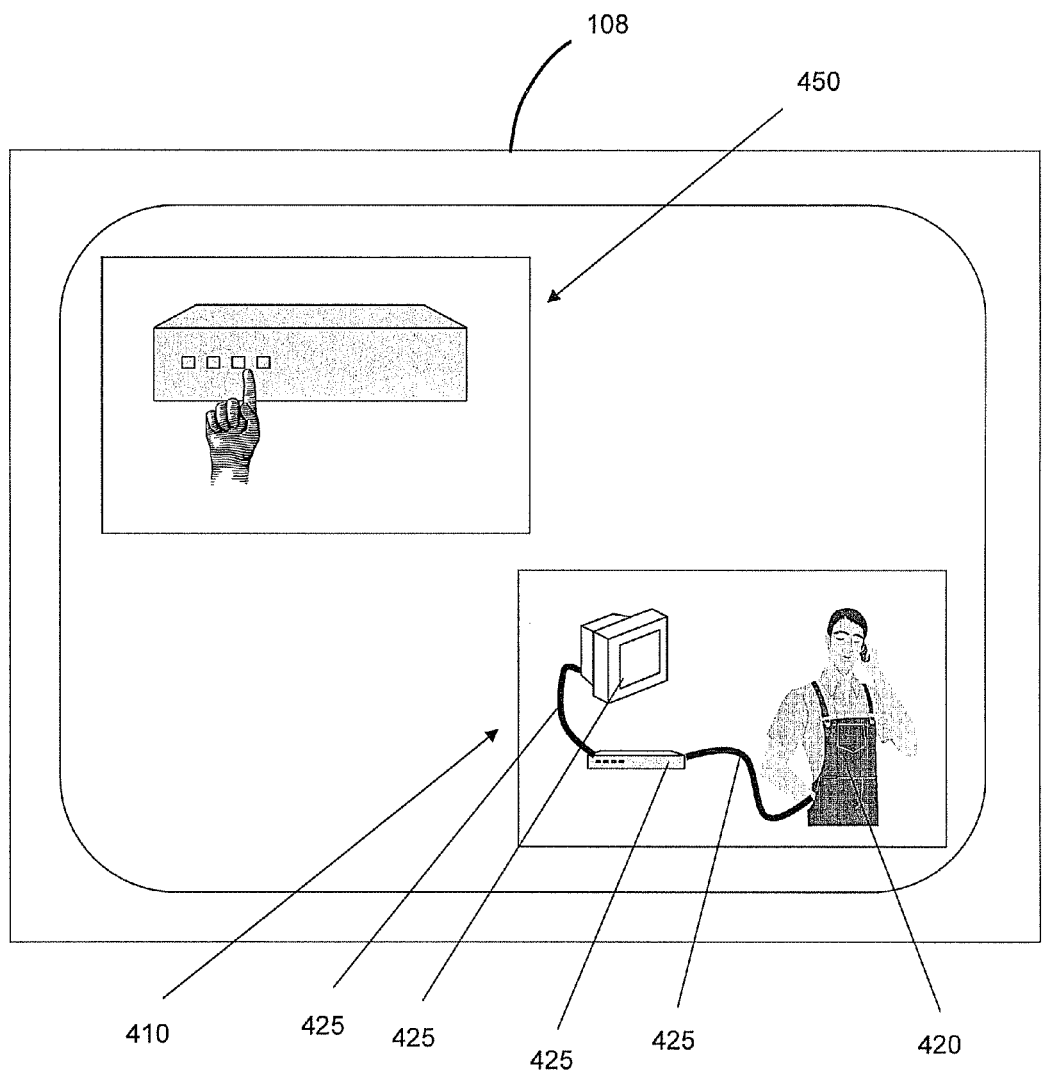
FIG. 4 depicts an exemplary embodiment of a graphical user interface for a tutorial of a set top box operating in portions of the communication systems.

FIG. 4 depicts an exemplary embodiment of a graphical user interface (GUI) 400 for a tutorial for a set top box or other device used for receiving and presenting multimedia content, including set top box 106 of communication systems 100 and 300. The GUI 400 can be displayed on a media device 108. The tutorial can be presented in a small frame within a larger overall screen to allow use of smaller-sized videos that facilitate delivery by DSL-based streaming content. In one embodiment, the remainder of the screen can be used to present contextually-related commands.

In one embodiment, portions of the tutorial video can be made available and/or presented as a user navigates through the STB operational interface. For example, each functional section (e.g., TV, Movies, Music, Photos) of the STB operational interface can provide access to a library of topical help videos specific to that section (e.g., the TV section can include videos about how to program a DVR or how to create a custom guide). A portion of the library of tutorial videos can be stored locally, such as on the hardrive of the STB 106, as well as remotely, such as in a media database. In one embodiment, the remote source for the tutorial videos can be a plurality of remote sources. In another embodiment, one or more of the tutorial videos can be retrieved from a remote source, such as through use of a query, including a query based on a model number of the STB 106. The present disclosure also contemplates the use of an overall help library, which can include topics that do not fit in the functional sections.

In another embodiment, the GUI 400 can include a pop-up window 410 with interactive video and/or audio media presented therein. The GUI 400 can also include a pop-up window 450 with contextual video and/or audio media presented therein. The present disclosure also contemplates the interactive and/or contextual media being presented across the entire monitor and/or presented as transparent images. The interactive video and/or audio media of pop-up window 410 can be an interactive tutorial related to the set top box 106. The tutorial can provide assistance with respect to operation, maintenance and other aspects of the STB, and can include one or more graphic objects 420 that are controllable based on user inputs, as well as one or more graphic objects 425 that are not controllable by the user. The graphic objects 420 and 425 can represent various real world objects, including components of the STB 106, such as cables, switches, and others. The user inputs can be from various sources, including the media controller 107 (e.g., an infrared or RF remote control).

The graphic objects 425 can be adjusted based upon interaction with the graphic objects 420, which are being controlled by the user. In one example, the pop-up window 410 can present a video on browsing the VoD catalog, where graphic objects 425 that are buttons allow the user to begin the browsing experience, search the catalog, or perform other related actions. The objects or buttons 425 can be depressed through manipulation of graphic object 420, which can be a pointer, hand or other cursor. The graphic objects or buttons 425 can be images that are part of the video or can be other graphic objects that are superimposed or otherwise included in the video, such as computer animations. The depressing of the graphic objects 425 can also result in presentation of the pop-up window 450 with a contextual video presented therein associated with the browsing experience, searching the catalog, or performing other related actions.

As another example, a user who desires assistance in connecting a component with the STB 106, such as webcam 380, can manipulate a graphic object 420 representing a user to connect or disconnect graphic object 425 representing a USB cable. In one embodiment, manipulation of the graphic object 420 (e.g., the user) to connect or disconnect the graphic object 425 (e.g., the USB cable) can result in presentation of the pop-up window 450 with a contextual video presented therein that is associated with the newly added component (e.g., webcam 380), such as instructions on its operation or other available components.

Figure 5:
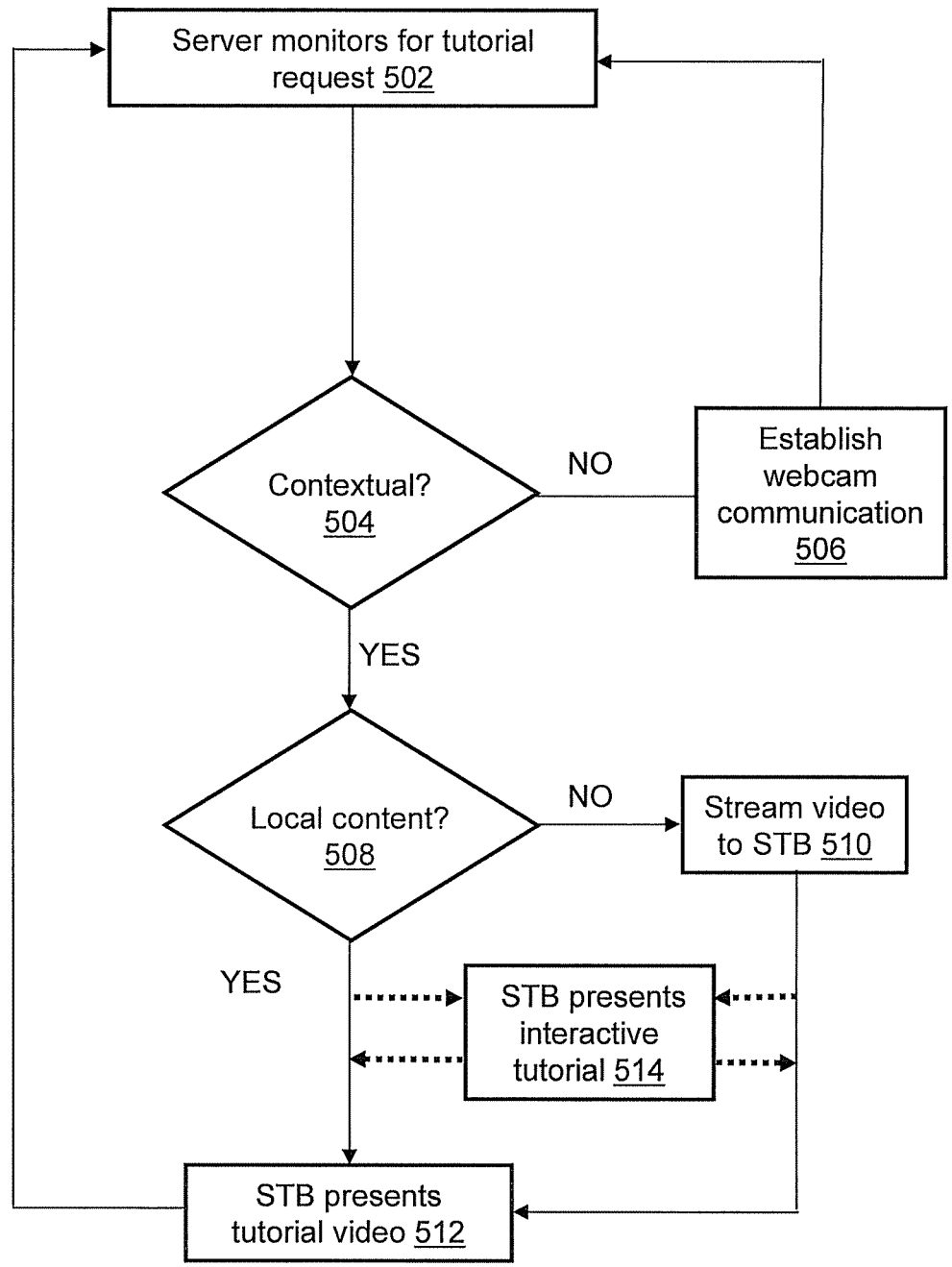
FIG. 5 depicts an exemplary method operating in portions of the communication systems.

FIG. 5 depicts an exemplary method 500 operating in portions of the communication systems 100-300. Method 500 has variants as depicted by the dashed lines. It would be apparent to an artisan with ordinary skill in the art that other embodiments not depicted in FIG. 5 are possible without departing from the scope of the claims described below. For convenience, reference to one or more features of communication system 300 as used in the following paragraphs can mean one or more features of the communication systems 100, 200, and 300 singly or in combination, including servers 322 and 350.

Method 500 begins with step 502 in which the STB server 350 can monitor for tutorial requests being made by a user of the STB 106. The monitoring can be done by various techniques, and can include receiving a message from the STB 106 that a particular type of tutorial request has been made by a user. In step 504, the STB server 350 can determine if a tutorial request is contextual. For example, the STB server 350 can determine if the request was made by a user while navigating through the operational interface of the STB 106, such as through a particular functional section.

If it is determined that the request was not contextual then in step 506, the STB server 350 can establish real time communication using the webcam 380 of the STB 106 and the webcam 380 of support personnel at the support center 375. The STB server 350 can then continue to monitor for additional tutorial requests, as recited back in step 502.

If on the other hand, it is determined that the request was contextual, then in step 508 the STB server 350 can determine whether the tutorial video indicated by the contextual request is locally stored content on the STB 106. If the content is not local to the STB 106, then in step 510 the STB server 350 can transmit the tutorial video to the STB, such as by streaming. However, the present disclosure contemplates other methods of delivery, including progressive or full download. The STB 106 can then present the tutorial video requested by the user, as in step 512.

If on the other hand, the content is local to the STB 106, then the STB can present the tutorial video requested by the user, as in step 512, and continue to monitor for tutorial requests as recited back in step 502. The tutorial videos that are locally stored by the STB 106, as compared to those that must be accessed from a remote or backend source, can vary. For example, tutorial videos directed to broadband or other communication problems, as well as how to set up or get started with the STB 106, can be locally stored to provide this assistance when no communication link exists. As another example, tutorial videos that are more frequently accessed, such as a common operation (e.g., scheduling recordings) or common problem, can also be locally stored. In one embodiment, the STB server 350 can determine the locally stored tutorial videos based on user or STB activity. For example, the STB server 350 can monitor frequency of access to particular tutorial videos by the user, or STB operations and problems more frequently performed and encountered by the user to determine which tutorial videos should be locally stored by the STB 106.

In one embodiment as shown in step 514, the STB 106 can present an interactive tutorial video such as through use of pop-up window 410 of GUI 400. As described above, the interactive tutorial video allows a user to adjust the graphic objects 425 based upon interaction with the graphic object 420, which is being controlled by the user, such as through interactive user inputs via a remote control 107. Manipulation of the interactive tutorial video can also result in presentation of a contextual tutorial video, such as in pop-up window 450 of GUI 400.

Upon reviewing the aforementioned embodiments, it would be evident to an artisan with ordinary skill in the art that said embodiments can be modified, reduced, or enhanced without departing from the scope and spirit of the claims described below. In one embodiment, the STB 106 can perform one or more of the steps described herein with respect to the STB server 350, such as determining the type of tutorial request being made or determining which tutorial videos are to be stored locally. In addition to providing tutorial videos in response to a request by a user, the STB server 350 and/or the STB 106 can present or otherwise notify the user of the availability of a tutorial video. In one embodiment, the tutorial video can be made available in response to monitored activity with respect to the STB 106, such as an error or other performance-based criteria. In another embodiment, the STB 106 can be a part of a group of STBs in communication with each other, where a portion of the tutorial video library is stored on one or more of the STBs of the group.

In one embodiment, the interactive tutorial video can be a periodical newsletter or information source presented to the user by way of the STB 106 and display monitor 108. The periodical video can include graphic buttons or the like that can be actuated as described above, so as to perform various tasks, such as ordering new services or new releases. In another embodiment, the interactive video can be used as part of the billing process, so a user can review his or her subscription and services, as well as perform other billing related steps, such as payment.

These are but a few examples of modifications that can be applied to the present disclosure without departing from the scope of the claims. Accordingly, the reader is directed to the claims section for a fuller understanding of the breadth and scope of the present disclosure.

Figure 6:
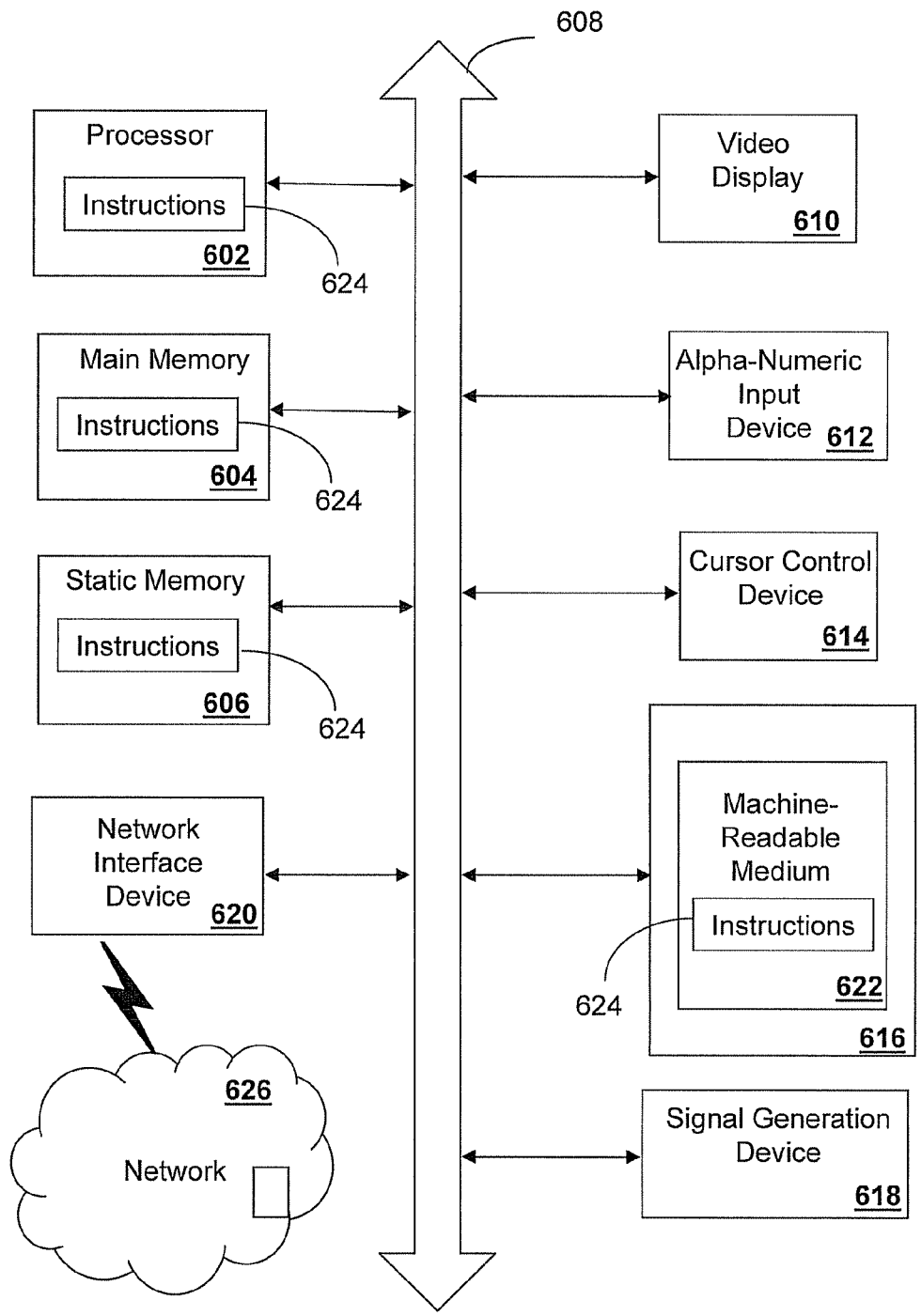
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a mass storage medium 616, a signal generation device 618 (e.g., a speaker or remote control) and a network interface device 620.

The mass storage medium 616 may include a computer-readable storage medium 622 on which is stored one or more sets of instructions (e.g., software 624) embodying any one or more of the methodologies or functions described herein, including those methods illustrated above. The computer-readable storage medium 622 can be an electromechanical medium such as a common disk drive, or a mass storage medium with no moving parts such as Flash or like non-volatile memories. The instructions 624 may also reside, completely or at least partially, within the main memory 604, the static memory 606, and/or within the processor 602 during execution thereof by the computer system 600. The main memory 604 and the processor 602 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the computer-readable storage medium 622 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions which when executed by a processor cause the processor to perform operations comprising:
presenting an operational interface for a set top box on a display monitor, the operational interface comprising computer animations and having a plurality of graphic controls for use of the set top box by a user;
monitoring for a user input associated with one of the plurality of graphic controls;
detecting the user input;
providing, via the set top box, tutorial support via a live video session with service personnel when the user input is not contextual;
responsive to the user input being contextual:
identifying a tutorial video responsive to detecting the user input, the tutorial video comprising information associated with the use of the set top box and the one of the plurality of graphic controls;
determining a location of the tutorial video from a library of tutorial videos as a determined location of the tutorial video, the library comprising local storage on the set top box and remote storage, the location comprising one of the local storage or the remote storage;
obtaining the tutorial video from one of the local storage or the remote storage based on the determined location of the tutorial video;
presenting a group of graphic objects in the tutorial video that are controllable by a controllable graphic object, wherein the group of graphic objects comprises one of objects that graphically represent one of customer equipment, objects that graphically represent a functional interface of the set top box, objects that comprise video presentations contextually related to the tutorial video, or any combination thereof;
presenting the controllable graphic object in the tutorial video that is controllable by user input for manipulating a target graphic object from the group of graphic objects;
receiving user input to cause the controllable graphic object to interact with the target object;
presenting a pop-up window associated with the target object that provides a tutorial contextually related to the controllable object interacting with the target object; and
presenting to the user a notification of an availability of the tutorial video; and
presenting the tutorial video on the display monitor in response to a selection of the notification of the availability of the tutorial video by the user.

2. The non-transitory computer-readable storage medium of claim 1, comprising computer instructions which when executed by the processor cause the processor to perform the operations comprising obtaining the tutorial video from the remote storage by one of a progressive download, a full download, or streaming.

3. A server, comprising:
a memory to store computer instructions; and
a controller coupled to the memory, wherein the controller when executing the computer instructions performs operations comprising:
monitoring for a tutorial request from a set top box coupled to a monitor display, the tutorial request being associated with use of the set top box, wherein the set top box presents an operational interface on a monitor display, the operational interface comprising computer animations having a plurality of graphic controls for use of the set top box by a user;
detecting the tutorial request;
providing, via the set top box, tutorial support via a live video session with service personnel when the tutorial request is not contextual;
responsive to the tutorial request being contextual:
identifying a tutorial video responsive to detecting the tutorial request, the tutorial video comprising information associated with the use of the set top box; and
transmitting the tutorial video to the set top box, wherein the tutorial video comprises a group of graphic objects in the tutorial video that are controllable by a controllable graphic object, wherein the group of graphic objects comprises one of objects that graphically represent one of customer equipment, objects that graphically represent a functional interface of the set top box, objects that comprise video presentations contextually related to the tutorial video, or any combination thereof, wherein the controllable graphic object is controllable by user input for manipulating a target graphic object from the group of graphic objects;
presenting the controllable graphic object in the tutorial video that is controllable by user input for manipulating a target graphic object from the group of graphic objects;
receiving user input to cause the controllable graphic object to interact with the target object;
presenting a pop-up window associated with the target object that provides a tutorial contextually related to the controllable object interacting with the target object;
presenting a notification to a user of the set top box indicating an availability of the tutorial video; and
presenting the tutorial video on the display monitor in response to a selection of the notification of the availability of the tutorial video by the user.

4. The server of claim 3, wherein the controller when executing the computer instructions performs the operations comprising transmitting the tutorial video to the set top box by one of a progressive download, a full download, or streaming.

5. A server, comprising:
a memory to store instructions; and
a processor coupled to the memory, wherein responsive to executing the instructions, the processor performs operations comprising:
monitoring for a tutorial request from a set top box coupled to a monitor display, the tutorial request being associated with use of the set top box, wherein the set top box presents an operational interface on the monitor display, the operational interface comprising computer animations having a plurality of graphic controls for use of the set top box by a user;
determining a tutorial type based on detecting the tutorial request; and
facilitating establishment of real time communication using a first webcam coupled to the set top box and a second webcam coupled to a communication device at a support center when the tutorial request is not contextual;

responsive to the tutorial request being contextual:
identifying a tutorial video based on detecting the tutorial request when the tutorial request is contextual;
transmitting the tutorial video to the set top box, wherein the tutorial video comprises a group of graphic objects in the tutorial video that are controllable by a controllable graphic object, wherein the group of graphic objects comprises one of objects that graphically represent one of customer equipment, objects that graphically represent a functional interface of the set top box, objects that comprise video presentations contextually related to the tutorial video, or any combination thereof, wherein the controllable graphic object is controllable by user input for manipulating a target graphic object from the group of graphic objects;
presenting the controllable graphic object in the tutorial video that is controllable by user input for manipulating a target graphic object from the group of graphic objects;
receiving user input to cause the controllable graphic object to interact with the target object;
presenting a pop-up window associated with the target object that provides a tutorial contextually related to the controllable object interacting with the target object;
presenting to the user a notification of an availability of the tutorial video; and
presenting the tutorial video on the display monitor in response to a selection of the notification of the availability of the tutorial video by the user.

6. The server of claim 5, wherein the customer equipment comprises one of a cable, a webcam, or a switch.

7. The server of claim 5, wherein the operations further comprise:
determining a location of the tutorial video from a library of tutorial videos, the library comprising local storage on the set top box and remote storage, the location comprising one of the local storage or the remote storage; and
obtaining the tutorial video from a remote source when the location is the remote storage.

8. A set top box, comprising:
a memory to store instructions; and
a processor coupled to the memory, wherein responsive to executing the instructions, the processor performs operations comprising:
monitoring for a tutorial request from a set top box of a group of set top boxes, the set top box being coupled to a monitor display, the tutorial request being associated with use of the set top box, wherein the set top box presents an operational interface on the monitor display, the operational interface comprising computer animations having a plurality of graphic controls for use of the set top box by a user;
determining a tutorial video responsive to detecting the tutorial request when the tutorial request is not for a video conference, the tutorial video comprising information associated with the use of the set top box; and
responsive to the tutorial request not being for the video conference:
transmitting the tutorial video to the set top box, wherein the tutorial video comprises a group of graphic objects in the tutorial video that are controllable by a controllable graphic object, wherein the group of graphic objects comprises one of objects that graphically represent one of customer equipment, objects that graphically represent a functional interface of the set top box, objects that comprise video presentations contextually related to the tutorial video, or any combination thereof, and wherein the controllable graphic object is controllable by user input for manipulating a target graphic object from the group of graphic objects;
presenting the controllable graphic object in the tutorial video that is controllable by user input for manipulating a target graphic object from the group of graphic objects;
receiving user input to cause the controllable graphic object to interact with the target object;
presenting a pop-up window associated with the target object that provides a tutorial contextually related to the controllable object interacting with the target object;
presenting to the user a notification of an availability of the tutorial video; and
presenting the tutorial video on the display monitor in response to a selection of the notification of the availability of the tutorial video by the user.

9. The set top box of claim 8, wherein the group of graphic objects comprises one of objects that graphically represent one of customer equipment, objects that graphically represent a functional interface of the set top box, objects that comprise video presentations contextually related to the tutorial video, or any combination thereof, wherein the controllable graphic object is controllable by user input for manipulating a target graphic object from the group of graphic objects.

10. The set top box of claim 8, wherein the operations further comprise facilitating establishment of real time communication using a first webcam coupled to the set top box and a second webcam coupled to a communication device at a support center when the tutorial request is for the video conference.

11. A method, comprising:
presenting an operational interface for a set top box on a display monitor, the operational interface comprising computer animations and having a plurality of graphic controls for use of the set top box by a user;
monitoring for a user input to the set top box;
detecting the user input;
determining a tutorial request responsive to detecting the user input;
establishing real time communication using a first webcam coupled to the set top box and a second webcam coupled to a communication device at a support center when the tutorial request is for a video conference; and
responsive to the tutorial request not being for the video conference:
identifying a tutorial video corresponding to the user input when the tutorial request is not for the video conference, the tutorial video comprising a group of graphic objects in the tutorial video that are controllable by a controllable graphic object;
determining a location of the tutorial video from a library of tutorial videos as a determined location of the tutorial video, the library comprising local storage on the set top box and remote storage the location comprising one of the local storage or the remote storage;
obtaining the tutorial video from one of the local storage or the remote storage based on he determined location of the tutorial video;
presenting the controllable graphic object in the tutorial video that is controllable by user input for manipulat ing a target graphic object from the group of graphic objects, wherein the group of graphic objects comprises one of objects that graphically represent one of customer equipment, objects that graphically represent a functional interface of the set top box, objects that comprise video presentations contextually related to the tutorial video, or any combination thereof;

receiving user input to cause the controllable graphic object to interact with the target object;

presenting a pop-up window associated with the target object that provides a tutorial contextually related to the controllable object interacting with the target object;

presenting to the user a notification of an availability of the tutorial video; and presenting the tutorial video on the display monitor in response to a selection of the notification of the availability of the tutorial video by the user.

12. The method of claim 11, further comprising:

determining a location of the tutorial video from a library of tutorial videos when the tutorial request is not for the video conference, the library comprising local storage on the set top box and remote storage, the location comprising one of the local storage or the remote storage; and obtaining the tutorial video from a remote source when the location is the remote storage.

13. The method of claim 11, wherein the group of graphic objects comprises one of objects that graphically represent one of customer equipment, objects that graphically represent a functional interface of the set top box, objects that comprise video presentations contextually related to the tutorial video, or any combination thereof, and wherein the controllable graphic object is controllable by user input for manipulating a target graphic object from the group of graphic objects.

\* \* \* \* \*